(12) United States Patent
Rousseau et al.

(10) Patent No.: US 10,578,370 B2
(45) Date of Patent: Mar. 3, 2020

(54) INTEGRATED HEAT EXCHANGER AND COOLANT RESERVOIR

(71) Applicant: Modine Manufacturing Company, Racine, WI (US)

(72) Inventors: Tony Rousseau, Racine, WI (US); Michael Reinke, Franklin, WI (US); Gregory Mross, Mt Pleasant, WI (US)

(73) Assignee: Modine Manufacturing Company, Racine, WI (US)

( * ) Notice: Subject to any disclaimer, the term of this patent is extended or adjusted under 35 U.S.C. 154(b) by 0 days.

(21) Appl. No.: 15/994,342

(22) Filed: May 31, 2018

(65) Prior Publication Data

US 2018/0356161 A1 Dec. 13, 2018

Related U.S. Application Data

(60) Provisional application No. 62/518,647, filed on Jun. 13, 2017.

(51) Int. Cl.
*F28D 15/00* (2006.01)
*F28D 15/02* (2006.01)

(52) U.S. Cl.
CPC ................ *F28D 15/0266* (2013.01)

(58) Field of Classification Search
CPC .... F25B 39/04; F28D 1/05383; F28D 1/0443; F28D 15/0266; F28D 20/021; H01M 10/613; H01M 10/625; H01M 8/04029; H01M 8/04701; H01M 2220/20; H01M 2250/20; B60H 1/3227; F28F 2255/16

USPC .................................................... 165/104.22
See application file for complete search history.

(56) References Cited

U.S. PATENT DOCUMENTS

| 5,129,144 | A | * | 7/1992 | Halstead | B60H 1/3227 |
|---|---|---|---|---|---|
| | | | | | 29/890.035 |
| 7,258,153 | B2 | | 10/2007 | Bruun et al. | |
| 9,017,436 | B2 | | 4/2015 | Chen et al. | |
| 2013/0175016 | A1 | * | 7/2013 | Steele | F28D 1/0443 |
| | | | | | 165/175 |
| 2014/0054017 | A1 | * | 2/2014 | Takahashi | F28D 1/05383 |
| | | | | | 165/172 |
| 2015/0292820 | A1 | * | 10/2015 | Katoh | F25B 39/04 |
| | | | | | 165/140 |
| 2017/0240177 | A1 | * | 8/2017 | Fujii | B62D 15/025 |

FOREIGN PATENT DOCUMENTS

| CN | 101545565 A | 9/2009 |
|---|---|---|
| WO | 16016428 A1 | 2/2016 |

* cited by examiner

*Primary Examiner* — Davis D Hwu
(74) *Attorney, Agent, or Firm* — Michael Best & Friedrich LLP; Jeroen Valensa; Michael Bergnach

(57) ABSTRACT

An integrated heat exchanger and coolant reservoir includes a reservoir structure that extends in a length direction from one end to an opposite end. A coolant inlet is arranged at one of the ends, and a coolant outlet is arranged at one of the ends. Coolant volumes extend in parallel along the length direction, and are fluidly connected in series to define a coolant flow path between the coolant inlet and the coolant outlet. An internal structure arranged within the reservoir structure has walls that separate individual coolant volumes from one another. Refrigerant flow paths are provided within at least one of the walls.

20 Claims, 4 Drawing Sheets

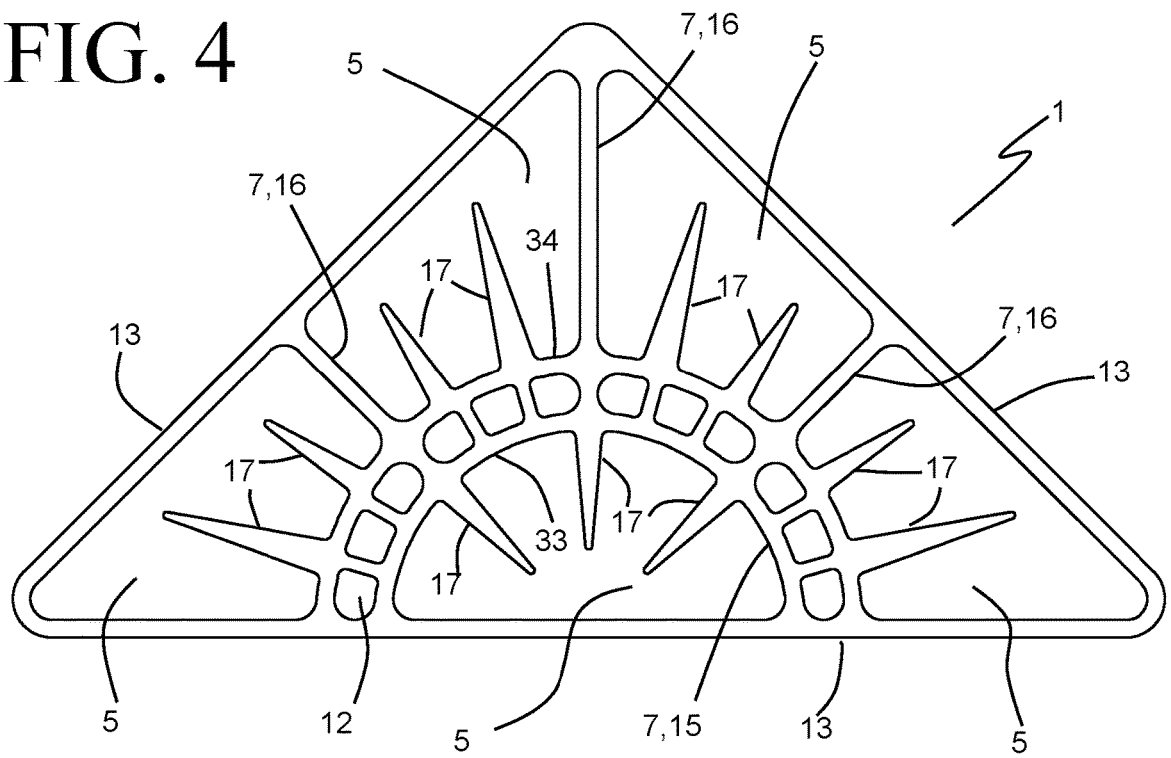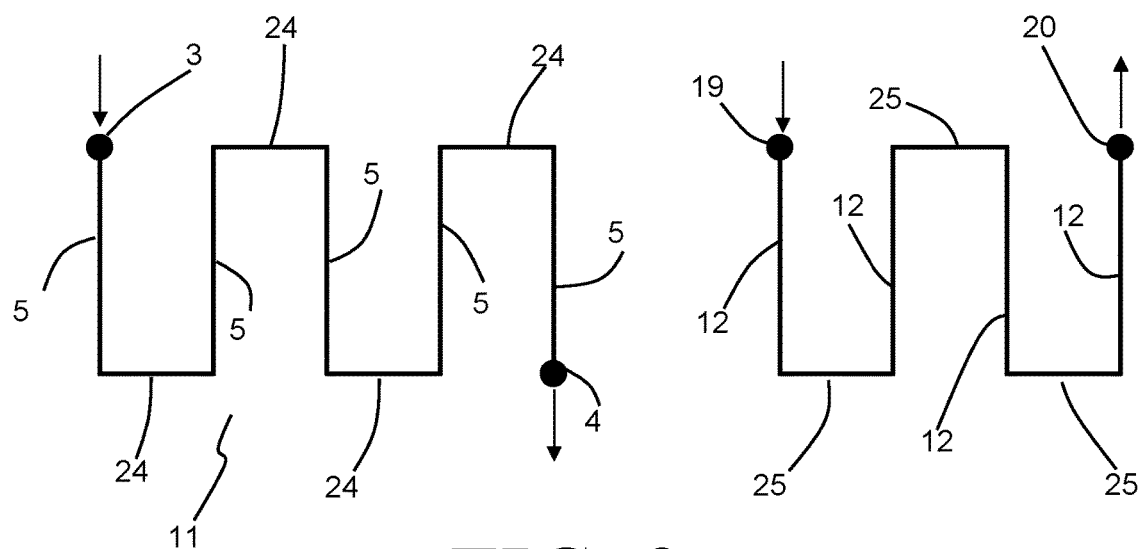

FIG. 7
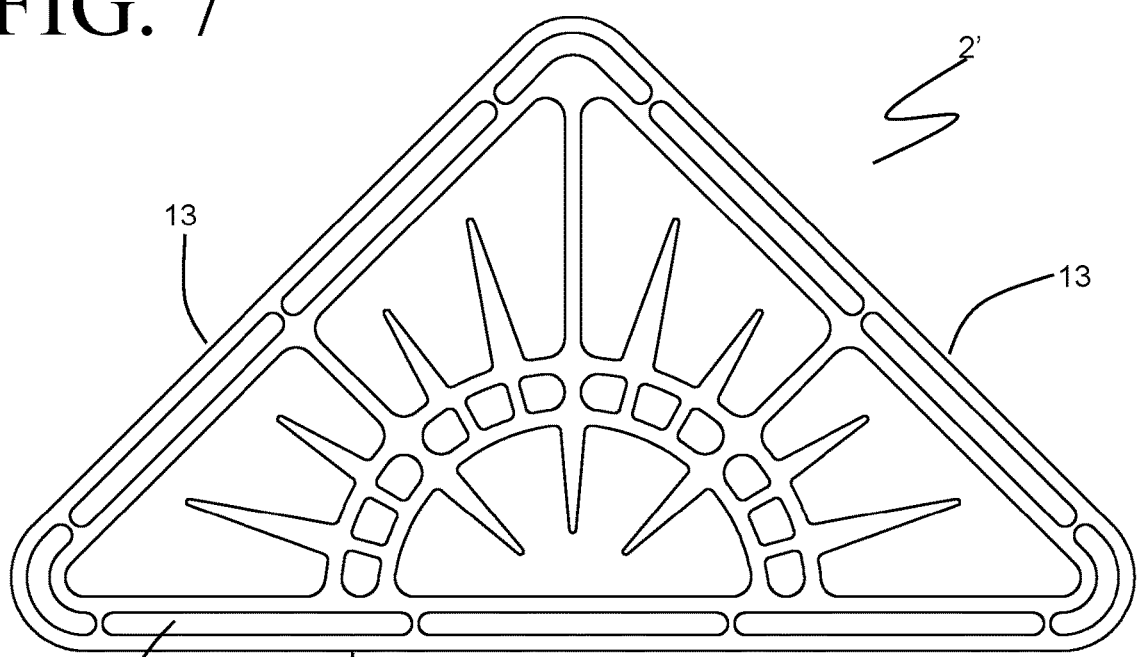
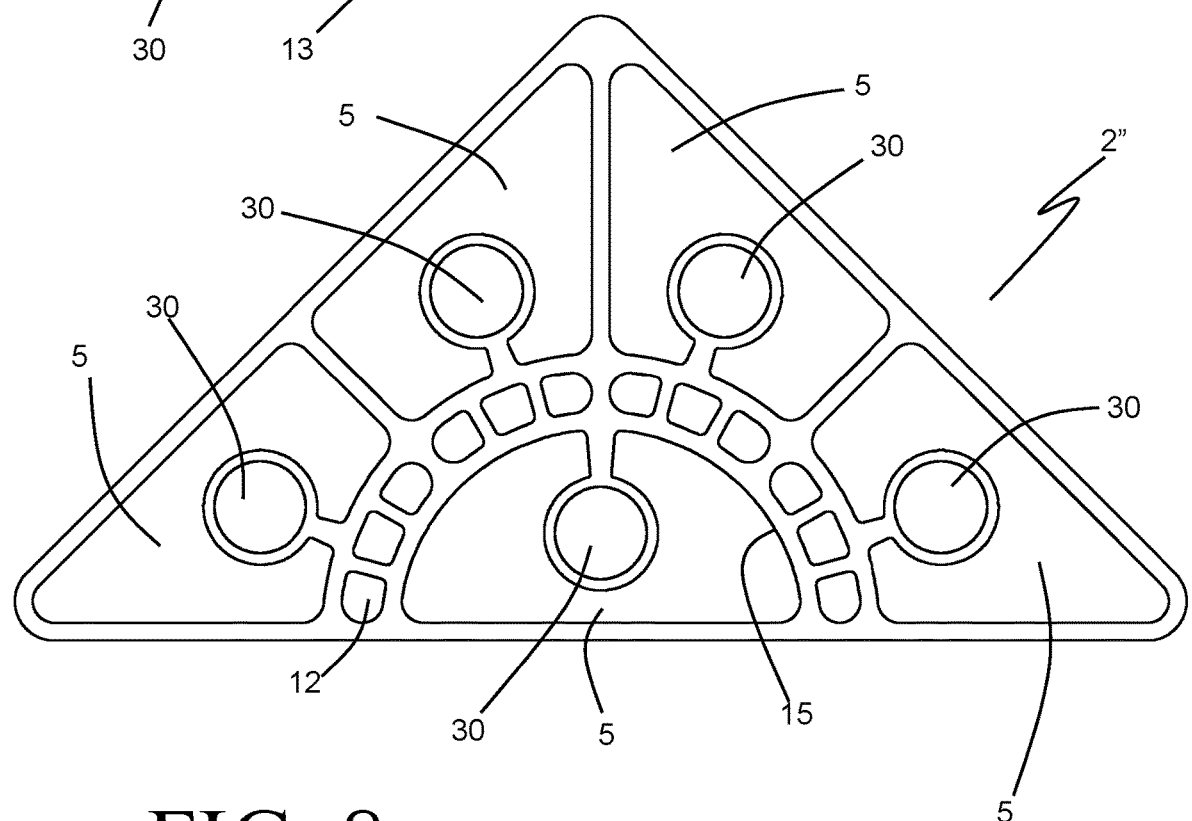
FIG. 8

INTEGRATED HEAT EXCHANGER AND COOLANT RESERVOIR

CROSS-REFERENCE TO RELATED APPLICATIONS

This application claims priority to U.S. provisional patent application No. 62/158,647, filed on Jun. 13, 2017, the entire contents of which are hereby incorporated by reference in their entirety.

BACKGROUND

In the operation of an internal combustion engine, electrical motor, fuel cell system, or other power-producing device or system for a vehicle, waste heat is invariably produced. Such waste heat must be removed from the vehicle in order to endure that the vehicle operates properly. Cooling systems employing one or more liquid coolant loops are often used for such a purpose. Coolant is circulated through various components of the liquid coolant loop, and is placed in heat exchange relation with heat producing sources and/or fluids circulating through the power-producing device or system. By way of example, such heat-producing sources can include engine blocks, batteries, transmissions, and fuel cell stacks, among others. Such fluids can include, by way of example, combustion air, exhaust gas, lubricating oil, transmission oil, fuel, and others.

The waste heat that is transferred to the coolant circulating through the liquid coolant loop must eventually be rejected from the vehicle itself. This step of heat rejection typically occurs by rejecting the heat from the liquid coolant to the ambient air in one or more radiators, thereby maintaining the temperature of the coolant in the liquid cooling loop within a relatively narrow and constant temperature range. While this is the most efficient means by which the waste heat can be removed from the vehicle, it does have its drawbacks. The temperature range within which the liquid coolant loop is controlled must be in excess of the temperature of the ambient air to which the heat is eventually rejected.

While such a limitation has traditionally not been problematic, as vehicle propulsion technologies have progressed, the desirable temperatures to which the heat-producing sources are controlled have reduced, making the take of rejecting the waste heat to a liquid coolant loop more challenging. By way of example, the desirable operating temperature of battery packs for electrical vehicles is substantially below the traditional operating temperatures of internal combustion engines. Similar concerns are raised in the operation of hydrogen fuel cell stacks. In addition, more stringent emissions regulations have driven a demand for reduced temperature levels in fluids such as pressurized combustion air (so-called charge air) and recirculated exhaust gas, among others.

The aforementioned concerns can be addressed by using a refrigerant circulating through a vapor compression cycle to cool the coolant of the liquid coolant loop to a temperature that is below that which can be readily achieved by direct rejection of the waste heat from the coolant to the ambient air. Such an approach can even be used to cool the coolant to a temperature that is sub-ambient, i.e. lower than the actual ambient temperature of the vehicle. While such a system may be suitable for its intended purpose, the operation of a vapor compression refrigerant system to remove the typically large rates of heat production associated with vehicle power sources can lead to undesirable decreases in overall system energy efficiency.

In some particular cases, it may be sufficient to provide a flow of chilled coolant to the heat-producing sources and/or heat-carrying fluids only during relatively short periods of operation where increased cooling capability is especially desirable. By way of example, during short and transient periods of high acceleration a flow of chilled coolant can be provided to produce increased heat transfer. Such short and transient events can be most efficiently accommodated by maintaining a storage of sufficient quantity of chilled fluid on board the vehicle, with the requisite chilling of the coolant being achieved by the refrigerant between successive events.

SUMMARY

It is an object of the invention to provide a device that can be compactly packaged into a motor vehicle and can provide both chilling of a liquid coolant through the use of a refrigerant and storage of a sufficient quantity of such chilled liquid coolant. Such a device thus functions as an integrated heat exchanger and coolant reservoir.

According to some embodiments of the invention, an integrated heat exchanger and coolant reservoir includes a reservoir structure that extends in a length direction from one end (a first end) to an opposite end (a second end). A coolant inlet is arranged at one of the ends, and a coolant outlet is arranged at one of the ends. In some embodiments the coolant inlet and coolant outlet are both arranged at the same end of the reservoir structure, while in other embodiments they are arranged at opposite ends. Coolant volumes extend in parallel along the length direction, and are fluidly connected in series to define a coolant flow path between the coolant inlet and the coolant outlet.

An internal structure is arranged within the reservoir structure. The internal structure has walls that separate individual coolant volumes from one another. Refrigerant flow paths are provided within at least one of the walls and also extend in the length direction.

In at least some such embodiments the integrated heat exchanger and coolant reservoir also includes one or more exterior walls that extend between the first end and the second end to bound the coolant volumes, and at least some of the walls of the internal structure are joined to the one or more exterior walls. In some embodiments the walls of the internal structure are joined to the one or more exterior walls by virtue of the the internal structure and the exterior walls being provided as a single monolithic single part, such, for example, an extrusion. In other embodiments the reservoir structure can be provided as a stack of plates from which internal sections are removed in order to define the coolant flow volumes, the refrigerant flow paths, the walls of the internal structure, and the exterior walls. Such a stack of plates can, for example, be joined together by brazing to from the integrated heat exchanger and coolant reservoir.

In some such embodiments the integrated heat exchanger and coolant reservoir includes only a single exterior wall, e.g. a cylindrical wall. In other such embodiments the integrated heat exchanger and coolant reservoir includes two, three, or more exterior walls that are joined together to define an outer periphery of the structure. In some embodiments the exterior wall or walls can be provided with insulating cavities arranged therein. Such insulating cavities can be filled with a thermally insulating material, for example a solid material having a low thermal conductivity, or a gas such as nitrogen or air, in order to minimize the transfer of heat between coolant arranged within the coolant volumes and the ambient environment. In alternative embodiments the insulating cavities can be evacuated to provide a vacuum or a near-vacuum therein to accomplish the same goal.

In some embodiments the walls of the internal structure includes a first wall that contains the refrigerant flow paths, and at least one second wall that extends between the first wall and one of the exterior walls. The at least one second wall can serve to separate two of the coolant volumes. In some embodiments there are multiple such second walls so that multiple coolant volumes can be provided within the structure. In some embodiments one or more of such second walls can extend between the first wall and two of the exterior walls by joining the two exterior walls at a junction point that is common to both of the exterior walls.

In some such embodiments, the first wall includes two bounding surfaces separated by a thickness of the wall, with the refrigerant flow paths arranged between the two bounding surfaces. One or more of the coolant volumes can be partially bounded by one of the two bounding surfaces, while one or more other ones of the coolant volumes can be partially bounded by the other bounding surface. In some such embodiments a coolant volume partially bounded by the first surface and a coolant volume partially bounded by the second surface can be fluidly connected in series by way of a coolant flow path that crosses over the first wall at one of the ends.

In at least some such embodiments the first wall connects to one or more of the exterior walls. The first wall can be connected to a single one of the exterior walls at more than one location. By way of example, in some embodiments the first walls is of an arcuate shape and spans 180 degrees such that each end of the first wall is joined to the same planar exterior wall at two different locations.

In at least some embodiments wherein one wall of the internal structure contains the refrigerant flow paths, every one of the coolant volumes is at least partially bounded by that one wall. Such an arrangement can provide certain advantages in that heat can readily be transferred between coolant residing in all of the coolant volumes and refrigerant passing through the refrigerant flow paths contained within that one wall.

In some embodiments the internal structure additionally includes fins that extend into the coolant volumes from one or more of the walls of the internal structure. It is most preferable for such fins to extend from the wall or walls that contain the refrigerant flow paths, so that more efficient heat transfer can be achieved between the coolant within the coolant volumes and refrigerant passing through the refrigerant flow paths. Fins can, however, also be provided extending from walls of the internal structure that do not contain refrigerant flow paths.

According to some embodiments of the invention, a refrigerant fitting block is provided at one of the ends of the integrated heat exchanger and coolant reservoir and includes a refrigerant inlet port and a refrigerant outlet port. Such a refrigerant fitting block can be used to connect the integrated heat exchanger and coolant reservoir into a refrigerant system so that refrigerant can be delivered to the refrigerant flow paths through the refrigerant inlet port at a first thermodynamic state and can be returned back to the refrigerant system through the refrigerant outlet port at a second thermodynamic state having a higher enthalpy than the first thermodynamic state. The refrigerant inlet port is fluidly connected to a first one of the refrigerant flow paths, and the refrigerant outlet port is connected to terminal one of the refrigerant flow paths. At least some of the refrigerant flow paths are joined together in series to provide a refrigerant circuit extending through the heat exchanger between the refrigerant inlet port and the refrigerant outlet port.

In some embodiments the refrigerant flow paths can be arranged in a series-parallel arrangement so that the refrigerant circuit includes two or more parallel flow paths between the refrigerant inlet port and the refrigerant outlet port. In such embodiments there can be multiple first ones of the refrigerant flow paths that are fluidly connected to the refrigerant inlet port, and there can likewise be multiple terminal ones of the refrigerant flow paths that are fluidly connected to the refrigerant outlet port.

According to some embodiments of the invention, the integrated heat exchanger and coolant reservoir includes a first plate assembly arranged at the first end and a second plate assembly arranged at the second end. The first and second plate assemblies close off at least some of the coolant volumes. The coolant inlet port and the coolant outlet port can each be joined to the first or the second plate assembly in order to fluidly connect to one of the coolant volumes. At least one coolant flow passage is provided within the first plate assembly in order to fluidly connect in series two of the coolant volumes. Similarly, at least one coolant flow passage is provided within the second plate assembly in order to fluidly connect in series another two of the coolant volumes. The coolant volumes can be connected, by way of such coolant flow passages arranged within the first and second plate assemblies, so that all of the coolant volumes are sequentially arranged between the coolant inlet and the coolant outlet ports.

At least one refrigerant flow passage can also be arranged within each one of the first and second plate assemblies so that two (or more) of the refrigerant flow paths extending through a wall or walls of the internal structure can be fluidly connected in series at each of the ends, so that the refrigerant circuit extending through the integrated heat exchanger and coolant reservoir can be constructed.

In at least some embodiments the internal structure additionally includes one or more volumes containing a phase change material. Such a phase change material can be a material that is trapped within those volumes and that has a phase transition temperature (e.g. a temperature at which the material changes state from a liquid to a solid through the rejection of heat, or vice-versa through the absorption of heat) that is generally the same or similar to a temperature at which the coolant is desirably stored within the reservoir. The phase change material preferably has a high latent heat capacity per unit mass. Walls of the internal structure can provide for conductive heat transfer between the phase change material and both coolant passing through the coolant volumes and refrigerant passing through the refrigerant flow paths. Heat can thereby be transferred from the phase change material to the cooler refrigerant, thereby converting the phase change material to a solid phase. As warmer temperature coolant is introduced to the coolant volumes, the phase change material can provide a thermal sink having a relatively high capacity to store heat at a temperature that generally corresponds to the temperature at which it is desired to store chilled coolant.

BRIEF DESCRIPTION OF THE DRAWINGS

FIG. 3 is a schematic diagram showing the flow of coolant and of refrigerant through the integrated heat exchanger and coolant reservoir of FIG. 1 according to some embodiments.

FIG. 4 is a plan view of a central portion of the integrated heat exchanger and coolant reservoir of FIG. 1.

FIG. 7 is a plan view of an alternative central portion of an integrated heat exchanger and coolant reservoir according to an embodiment of the invention.

FIG. 8 is a plan view of another alternative central portion of an integrated heat exchanger and coolant reservoir according to an embodiment of the invention.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
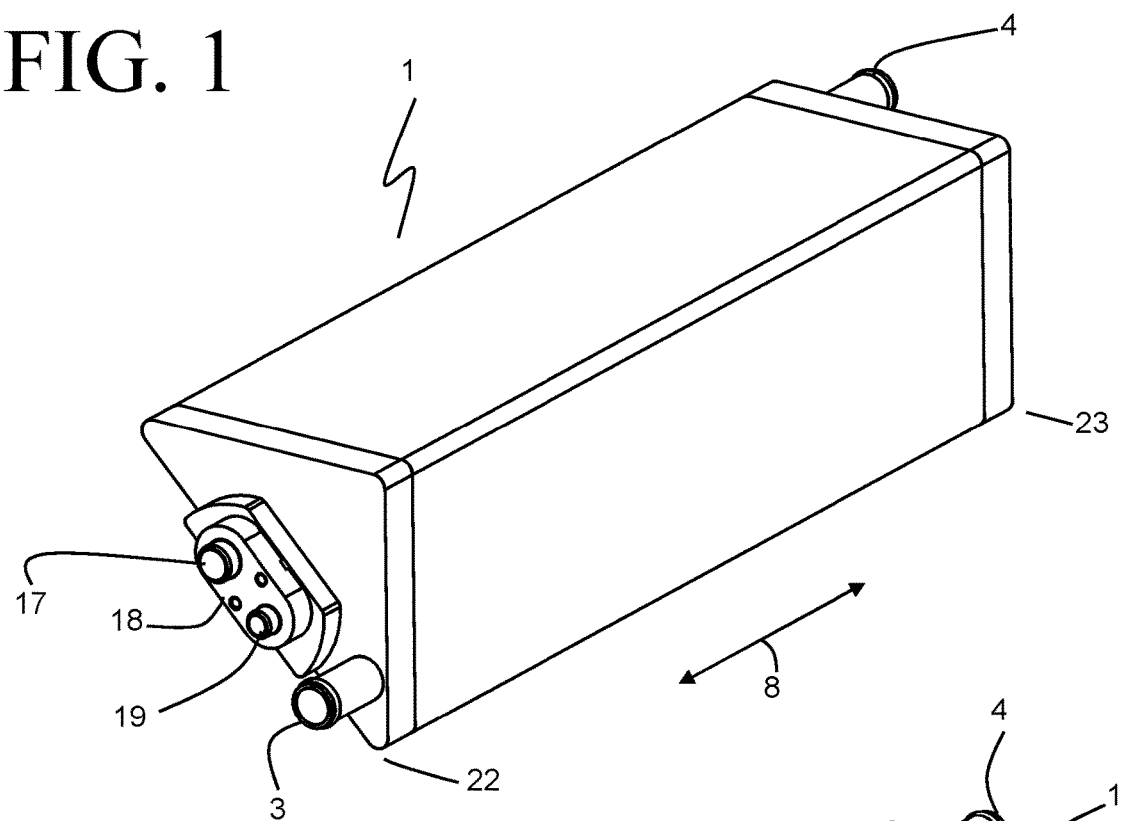
FIG. 1 is a perspective view of an integrated heat exchanger and coolant reservoir according to an embodiment of the invention.
Figure 2:
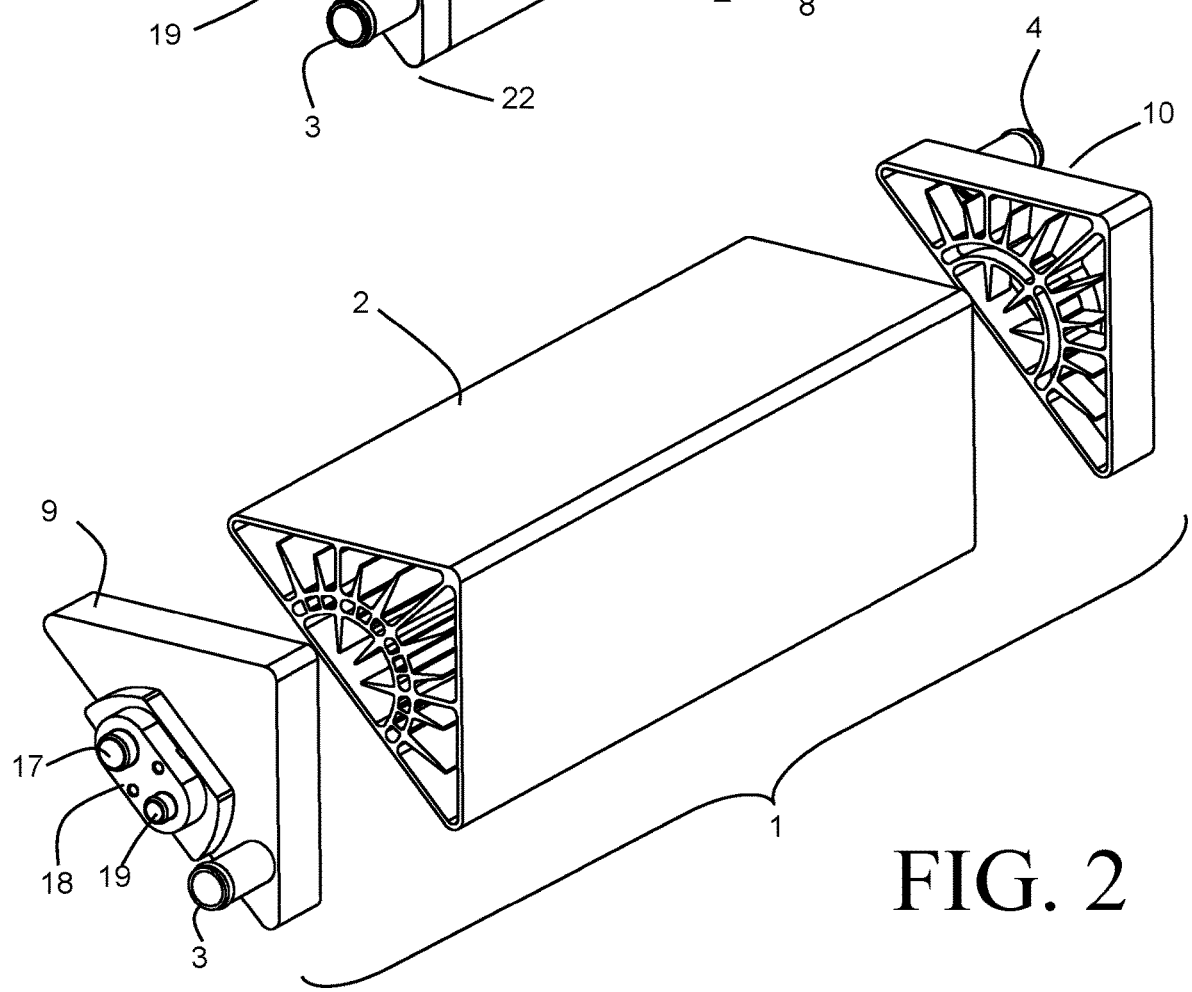
FIG. 2 is a partially exploded perspective view of the integrated heat exchanger and coolant reservoir of FIG. 1.

The integrated heat exchanger and coolant reservoir 1 depicted in FIGS. 1 and 2 has a reservoir structure 2 that extends in a length direction, indicated by the double-ended arrow 8, between an end 22 and an end 23. The reservoir structure 2 extends monolithically between those two ends, and is capped by a plate assembly 9 at the first end 22 and by a plate assembly 10 at the second end 23. The plate assembly 9 is shown in greater detail in FIG. 5, while the plate assembly 10 is shown in greater detail in FIG. 6.

A refrigerant fitting block 18 is provided at the end 22, and refrigerant inlet and outlet ports (indicated as 19 and 20, respectively) are joined to the fitting block 18 in order to fluidly connect the integrated heat exchanger and coolant reservoir 1 into a refrigerant system. A first coolant port 3 is also provided at the end 22, while a second coolant port 4 is provided at the end 23. Either one of the coolant ports 3, 4 can function as a coolant inlet port, with the other one of the coolant ports 3, 4 functioning as a coolant outlet port. Through the ports 3 and 4, the integrated heat exchanger and coolant reservoir 1 can also be fluidly connect to a liquid coolant loop.

While the coolant ports 3 and 4 are shown arranged at opposing ends, it should be understood that such an arrangement is not necessary in all cases. The coolant ports can alternatively both be arranged at the same end. Additionally, both of the coolant inlet ports can be located at the same end as the refrigerant fitting block 18 or at the opposite end. It should also be understood that, while the inclusion of the refrigerant ports 19, 20 at a common refrigerant fitting block 18 can advantageously provide for easy and reliable connection of the integrated heat exchanger and coolant reservoir 1 to the refrigerant circuit, it is also possible for the refrigerant inlet and outlet ports to be located at opposing ends instead.

FIG. 3 depicts, in schematic fashion, the flow of liquid coolant between the coolant inlet port (in this case indicated as the port 3) and the coolant outlet port (in this case indicated as the port 4). Coolant is received into the inlet port 3 (as indicated by the arrow at 3) and is routed through a series of consecutively arranged coolant volumes 5. Successive ones of the coolant volumes 5 are joined by connecting fluid channels 24, so that a coolant flow circuit 11 extending between the inlet port 3 and the outlet port 4 is defined. In the exemplary embodiment a total of five such coolant volumes 5 are depicted, but it should be understood that the number of such coolant volumes five can be greater or less than that in some embodiments, and no limitation to a particular number of coolant volumes is expressed or implied.

FIG. 3 also depicts, in schematic fashion, the flow of refrigerant between the inlet port 19 and the outlet port 20. Refrigerant is received into the inlet port 19 and is circulated through four sequentially connected refrigerant flow paths 12, successive ones of the refrigerant flow paths 12 being joined by connecting refrigerant channels 25. By way of the refrigerant flow paths 12 and connecting channels 25, a refrigerant circuit 21 is established between the refrigerant inlet 19 and the refrigerant outlet 20. As was the case with the coolant flow circuit 11, the number of refrigerant flow paths 12 can vary from the four such flow paths depicted.

The refrigerant flow circuit 21 is preferably a part of a larger refrigerant system. Such a refrigerant system can include a compressor, an expansion device, and a condenser, among other components. Refrigerant circulating through such a system can be expanded within the expansion device to a low-quality liquid and vapor thermodynamic state prior to entering the port 19, so that heat can be readily transferred into the refrigerant to vaporize the liquid refrigerant as it circulates through the circuit 21. The refrigerant is preferably removed through the port 20 as a slightly superheated vapor, and is subsequently routed to the compressor, wherein it is compressed to pressurized vapor state. The compressed vapor can then be delivered to a condenser, wherein heat can be rejected from the compressed refrigerant at relatively high temperature in order to condense and (optionally) sub-cool the refrigerant before again expanding the refrigerant in the expansion device.

The coolant circuit 11 is also preferably part of a larger coolant circuit. Coolant is preferably stored within the integrated heat exchanger and coolant reservoir 1 for a period of time, during which heat is transferred from the coolant to the refrigerant in order to chill the coolant. When especially high rates of cooling or especially reduced coolant temperatures are required or desired, coolant is removed from the coolant circuit 11 through the outlet 4 and is circuited to the components wherein the cooling is required. The chilled coolant removed from the integrated heat exchanger and coolant reservoir 1 is replaced by warmer coolant entering the coolant circuit 11 through the inlet port 3. In especially preferable embodiments, the volume of coolant stored along the coolant circuit 11 is sufficient to provide the desired cooling over the period of time required, and the ability to chill the coolant within the integrated heat exchanger and coolant reservoir 1 is sufficient to reduce the temperature of the newly arrived coolant to a suitably low temperature before the chilled coolant is again required.

The volume of coolant capable of being stored within the coolant reservoir 1 can be sized so that, under particular operating conditions, only a portion of the total stored volume of coolant is needed for a particular cooling event. The partitioning of the total coolant volume into multiple sequentially arranged coolant volumes can be particularly beneficial under such operating conditions, since that portion of the coolant that has had the longest residence time within the coolant reservoir 1 (and is therefore potentially lower in temperature than other portions of the coolant that have had a shorter residence time) is closest to the coolant outlet 4 can be delivered to the larger coolant circuit. In especially preferable embodiments, the coolant volumes 5 and connecting fluid channels 24 are designed to minimize mixing effects within the stored coolant, so that the longest resident coolant is removed first and the residence time for the coolant received into the coolant reservoir 1 is maximized. In this manner, the overall size of the coolant volume can be minimized without sacrificing the ability to deliver sufficient rates of appropriately cooled coolant.

The reservoir structure 2 is preferably constructed of a material having a high thermal conductivity, such as aluminum or other conductive metals. In some especially preferable embodiments, the reservoir structure 2 is formed as an aluminum extrusion that is cut to length. In other embodiments, however, the reservoir structure can instead be produced from a stack of thin stamped sheets or plates that are stacked together in the length direction 8 and are joined, such as by brazing.

The reservoir structure 2 is bounded by exterior walls 13 that define the outer shape of the coolant reservoir 1. Such an outer shape can be optimized to fit within the space available for the coolant reservoir 1 with a maximum amount of total coolant storage capacity. While in the exemplary embodiment of the coolant reservoir of FIG. 1 the outer shape is a generally triangular prismatic shape, it should be understood that any number of alternative shapes may be equally or more suitable for any given application. Also, while the exemplary embodiment is provided with three planar external walls 13, in other embodiments at least one of the walls may be non-planar. It is also possible for the coolant reservoir 1 to have a cylindrical shape, in which case there would be only a single external wall 13.

As best seen in FIG. 4, the reservoir structure 2 has internal features that at least partially define the multiple coolant volumes 5. Specifically, an internal structure 6 arranged within the reservoir structure 2 has a series of walls 7 that serve to separate individual ones of the coolant volumes 5. Each one of the walls 7 extends to, and joins to, at least one external wall 13 of the reservoir structure in at least one location. Specifically, in the exemplary embodiment depicted in FIG. 4, the walls 7 include an arcuately shaped wall 15 and three planar walls 16. The wall 15 is joined to a single one of the exterior walls 13 at two different locations, so that one of the coolant volumes 5 is defined between the wall 15 and that exterior wall 13. The 16 extend from the wall 15 to join with other ones of the exterior walls 13. Two of the walls 16 each join to a single exterior wall 13 at a single location, whereas the other of the walls 16 joins to two of the exterior walls 13 at a single location.

As can be seen, the internal structure 6 thus separates the individual coolant volumes so that each one of the walls 16 bounds two of the coolant volumes 5, while the wall 15 bounds each one of the coolant volumes 5. The internal wall 15 is substantially greater in thickness than the walls 16, and is provided with the refrigerant flow paths 12 extending in the length direction 8 within that wall 15. Each flow path 12 is provided as a grouping of three apertures that are arranged to be fluidly in parallel.

Figure 5:
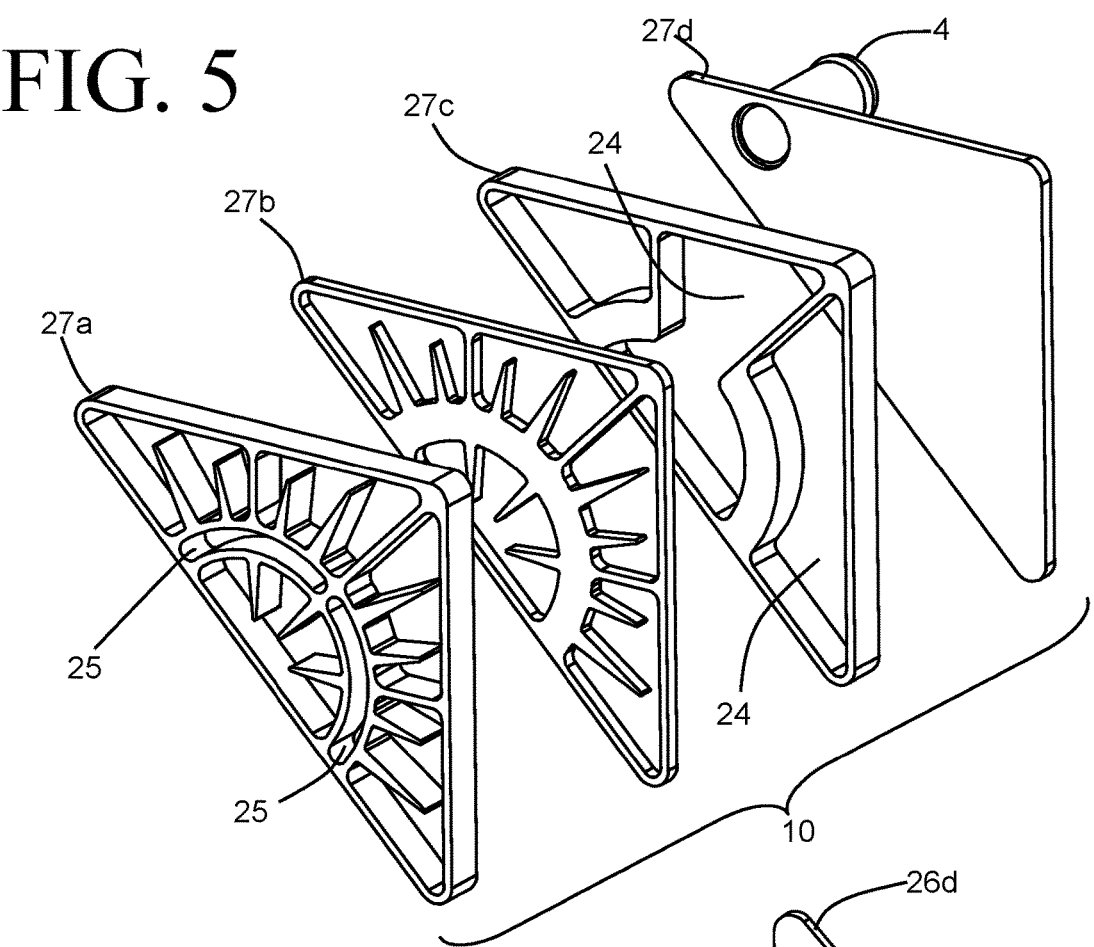
FIG. 5 is an exploded perspective view of an end portion of the integrated heat exchanger and coolant reservoir of FIG. 1.
Figure 6:
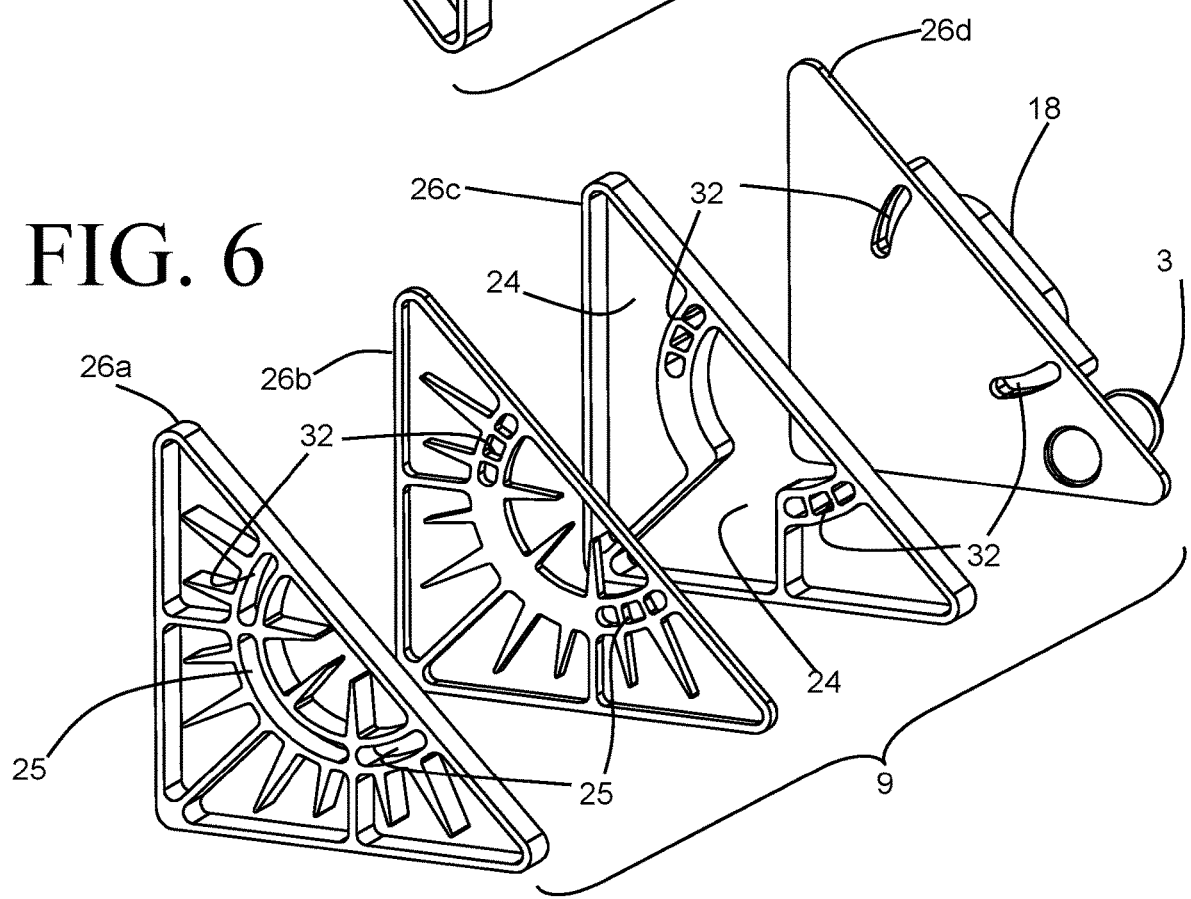
FIG. 6 is an exploded perspective view of another end portion of the integrated heat exchanger and coolant reservoir of FIG. 1.

The connecting fluid channels 24 for the coolant and the connecting refrigerant channels 25 for the refrigerant are provided within the plate assemblies 9, 10 at either end of the coolant reservoir 1. As shown in FIGS. 5 and 6, each plate assembly 9, 10 is constructed of multiple plates of varying thicknesses that are joined together to form a monolithic assembly that caps an end of the reservoir structure 2. It should be understood, however, that either such plate assembly could alternatively be replaced by a unitary component such as, for example, a casting, with equivalent properties and functionality.

The plate assembly 9 is constructed of four plates (26a, 26b, 26c, and 26d), each of which has an exterior profile that matches the exterior walls 13 of the reservoir structure 2. Each plate 26 is also provided with a variety of internal structures, which cooperate with the structures of the other plates 26 to provide certain features of the coolant flow circuit and the refrigerant flow circuit. As one such feature, a slot is provided within the plate 26a to create at least one refrigerant flow passage 25 providing fluid communication between two of the refrigerant flow paths 12 of the reservoir 1. Additionally, apertures 32 are provided in the plates to enable fluid communication between the refrigerant inlet port 19 and a first one of the refrigerant flow paths 12, and between the refrigerant outlet port 20 and a terminal one of the refrigerant flow paths 12. Also provided are two coolant flow passages 24. A first one of the coolant flow passages 24 connects the second and third sequential ones of the coolant volumes 5, and a second one of the coolant flow passages 24 connects the fourth and fifth sequential ones of the coolant volumes 5. In addition, internal features of the plates 26 allow for fluid communication between the coolant inlet port 3 and the first sequential one of the coolant volumes 5.

In a similar manner, the plate assembly 10 is constructed of four plates (27a, 27b, 27c, and 27d), each of which has an exterior profile that matches the exterior walls 13 of the reservoir structure 2. Each plate 27 is also provided with a variety of internal structures, which cooperate with the structures of the other plates 27 to provide certain features of the coolant flow circuit and the refrigerant flow circuit. Two slots are provided within the plate 27a to create refrigerant flow passages 25 enabling fluid communication between two sets of the refrigerant flow paths 12 of the reservoir 1. Also provided are two additional coolant flow passages 24. A first one of the coolant flow passages 24 connects the first and second sequential ones of the coolant volumes 5, and a second one of the coolant flow passages 24 connects the third and fourth sequential ones of the coolant volumes 5. In addition, internal features of the plates 26 allow for fluid communication between the coolant outlet port 3 and the terminal one of the coolant volumes 5.

Each of the plates 26 and the plates 27 can be formed from a metal sheet or plate by stamping, laser cutting, water jetting, wire electrode discharge machining, or other such material removing process. Alternatively, one or more of the plates 26, 27 can be formed as a casting, or as an extrusion, or by additive manufacturing. In at least some highly preferable embodiments, the plates 26 and the plates 27 are made of a brazeable material such as aluminum and are joined together along with the reservoir structure 2 by one or more brazing operations.

As coolant is routed through the succession of coolant volumes 5, heat is transferred from that coolant to the colder refrigerant circuiting through the refrigerant flow paths 12. As each one of the coolant volumes 5 is at least partially bounded by the internal wall 15 containing the refrigerant flow paths 12, the desired transfer of heat can be accomplished through portions of that wall 15 from coolant in each one of the volumes 5. Surface area augmenting fins 17 extend into the coolant volumes 5 from that wall 15 in order to increase the rate of heat transfer. In order to minimize the undesirable transfer of heat from warmer coolant in one of the volumes 5 to cooler coolant in a downstream one of the coolant volumes 5, the coolant volumes 5 are sequentially arranged so that the walls 16 are not arranged between those ones of the coolant volumes 5 that are furthest separated from one another along the coolant circuit 11. By way of example, the walls 16 are arranged between the first and third coolant volumes 5, and between the third and fourth coolant volumes 5, and between the fourth and fifth coolant volumes 5.

In some embodiments, such as the one shown in FIG. 7, an alternative reservoir structure 2' is provided with gaps or slots 31 within the exterior walls 13 to inhibit undesirable heat gain into the stored coolant from the ambient environment outside of the coolant reservoir by providing an insulating function. The slots 31 can be filled with a gas having a relatively low thermal conductivity, such as (for example) air, argon, helium, nitrogen, etc. Alternatively, the slots 31 can be filled with a solid insulating material. In some embodiments the slots 31 can be left void of both solid and gaseous material in order to provide a vacuum insulation.

In yet another embodiment, depicted in FIG. 8, reservoirs 30 for a phase change material are provided within the coolant volumes 5 of an alternative reservoir structure 2", and are thermally coupled to the interior wall 15 containing the refrigerant flow paths 12. During those periods of operation wherein coolant is stagnant within the coolant volumes 5, latent heat can be extracted from the phase change material into the refrigerant. Then, during those periods of operation wherein warmer coolant is introduced into the coolant volumes 5, the chilled phase change material can provide a sink that can absorb large quantities of heat from the warmer coolant, thereby augmenting the cooling capability of the refrigerant itself.

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

What is claimed is:

1. An integrated heat exchanger and coolant reservoir comprising:
   a reservoir structure extending in a length direction from a first end to a second end;
   a coolant inlet arranged at one of the first and second ends;
   a coolant outlet arranged at one of the first and second ends;
   a plurality of coolant volumes extending in parallel along the length direction and fluidly connected in series to define a coolant flow path between the coolant inlet and the coolant outlet;
   an internal structure arranged within the reservoir structure and having a plurality of walls separating individual ones of the plurality of coolant volumes, a plurality of refrigerant flow paths extending in the length direction within at least one of the plurality of walls; and
   a refrigerant fitting block arranged at the first end, the refrigerant fitting block having a refrigerant inlet port fluidly connected to a first one of the plurality of refrigerant flow paths and a refrigerant outlet port fluidly connected to a terminal one of the plurality of refrigerant flow paths, the plurality of refrigerant flow paths providing a refrigerant circuit extending between the refrigerant inlet port and the refrigerant outlet port.

2. The integrated heat exchanger and coolant reservoir of claim 1, further comprising one or more exterior walls extending between the first end and the second end to bound the plurality of coolant volumes, at least some of the plurality of walls of the internal structure being joined to the one or more exterior walls.

3. The integrated heat exchanger and coolant reservoir of claim 2, wherein the exterior walls and the interior structure are provided as a single extrusion.

4. The integrated heat exchanger and coolant reservoir of claim 2, wherein the exterior walls are provided with insulating cavities arranged therein.

5. The integrated heat exchanger and coolant reservoir of claim 1, wherein the internal structure includes a plurality of fins extending into the plurality of coolant volumes from at least one of the plurality of walls.

6. An integrated heat exchanger and coolant reservoir comprising:
   a reservoir structure extending in a length direction from a first end to a second end;
   a coolant inlet arranged at one of the first and second ends;
   a coolant outlet arranged at one of the first and second ends;
   a plurality of coolant volumes extending in parallel along the length direction and fluidly connected in series to define a coolant flow path between the coolant inlet and the coolant outlet;
   an internal structure arranged within the reservoir structure and having a plurality of walls separating individual ones of the plurality of coolant volumes, a plurality of refrigerant flow paths extending in the length direction within at least one of the plurality of walls; and
   one or more exterior walls extending between the first end and the second end to bound the plurality of coolant volumes, at least some of the plurality of walls of the internal structure being joined to the one or more exterior walls,
   wherein the plurality of walls of the internal structure includes a first wall connected to at least one of the exterior walls and containing the plurality of refrigerant flow paths, and at least one second wall extending between the first wall and one of the exterior walls to separate two coolant volumes of the plurality of coolant volumes.

7. The integrated heat exchanger and coolant reservoir of claim 6, wherein the first wall is arcuately shaped.

8. The integrated heat exchanger and coolant reservoir of claim 6, wherein every one of the plurality of coolant volumes is at least partially bounded by the first wall.

9. The integrated heat exchanger and coolant reservoir of claim 6, wherein the first wall includes a first surface and a second surface, the plurality of refrigerant flow paths being arranged between the first surface and the second surface, and wherein the plurality of coolant volumes includes a first coolant volume partially bounded by the first surface and a second coolant volume partially bounded by the second surface.

10. The integrated heat exchanger and coolant reservoir of claim 9, wherein the first coolant volume and the second coolant volume are fluidly connected by way of a coolant flow path crossing over the first wall at one of the first and second ends.

11. The integrated heat exchanger and coolant reservoir of claim 6, wherein the internal structure includes a plurality of volumes containing a phase change material, the walls of the internal structure providing for conductive heat transfer between the phase change material and both coolant passing through the plurality of coolant volumes and refrigerant passing through the plurality of refrigerant flow paths.

12. The integrated heat exchanger and coolant reservoir of claim 6, wherein the exterior walls and the interior structure are provided as a single extrusion.

13. The integrated heat exchanger and coolant reservoir of claim 6, wherein the exterior walls are provided with insulating cavities arranged therein.

14. The integrated heat exchanger and coolant reservoir of claim 6, wherein the internal structure includes a plurality of fins extending into the plurality of coolant volumes from at least one of the plurality of walls.

15. An integrated heat exchanger and coolant reservoir comprising:
 a reservoir structure extending in a length direction from a first end to a second end;
 a coolant inlet arranged at one of the first and second ends;
 a coolant outlet arranged at one of the first and second ends;
 a plurality of coolant volumes extending in parallel along the length direction and fluidly connected in series to define a coolant flow path between the coolant inlet and the coolant outlet;
 an internal structure arranged within the reservoir structure and having a plurality of walls separating individual ones of the plurality of coolant volumes, a plurality of refrigerant flow paths extending in the length direction within at least one of the plurality of walls;
 a first plate assembly arranged at the first end to close off at least some of the plurality of coolant volumes, the first plate assembly including a coolant flow passage to fluidly connect in series two coolant volumes of the plurality of coolant volumes and a refrigerant flow passage to fluidly connect in series two refrigerant flow paths of the plurality of refrigerant flow paths; and
 a second plate assembly arranged at the second end to close off at least some of the plurality of coolant volumes, the second plate assembly including a coolant flow passage to fluidly connect in series two coolant volumes of the plurality of coolant volumes and a refrigerant flow passage to fluidly connect in series two refrigerant flow paths of the plurality of refrigerant flow paths.

16. The integrated heat exchanger and coolant reservoir of claim 15, further comprising one or more exterior walls extending between the first plate assembly and the second plate assembly to bound the plurality of coolant volumes, at least some of the plurality of walls of the internal structure being joined to the one or more exterior walls.

17. The integrated heat exchanger and coolant reservoir of claim 15, wherein the plurality of walls of the internal structure includes a first wall connected to at least one of the exterior walls and containing the plurality of refrigerant flow paths, and at least one second wall extending between the first wall and one of the exterior walls to separate two coolant volumes of the plurality of coolant volumes.

18. The integrated heat exchanger and coolant reservoir of claim 17, wherein the two coolant volumes separated by the second wall are the two coolant volumes connected in series by the coolant flow passage of the first plate assembly, said coolant flow passage extending over the second wall.

19. The integrated heat exchanger and coolant reservoir of claim 18, wherein the first plate assembly further includes another coolant flow passage extending over the first wall to fluidly connect in series another two coolant volumes of the plurality of coolant volumes.

20. The integrated heat exchanger and coolant reservoir of claim 15, wherein the first plate assembly comprises a first plurality of brazed together metal plates joined by brazing to the first end of the reservoir structure and wherein the second plate assembly comprises a second plurality of brazed together metal plates joined by brazing to the second end of the reservoir structure.

* * * * *